3,096,181
FOOD PROCESSING METHOD AND APPARATUS
Morris S. Dixon, Robert B. Marshall, and John Ross Crerar, all of Leamington, Ontario, Canada, assignors to H. J. Heinz Company, Pittsburgh, Pa., a corporation of Pennsylvania
Filed Dec. 31, 1958, Ser. No. 784,173
1 Claim. (Cl. 99—150)

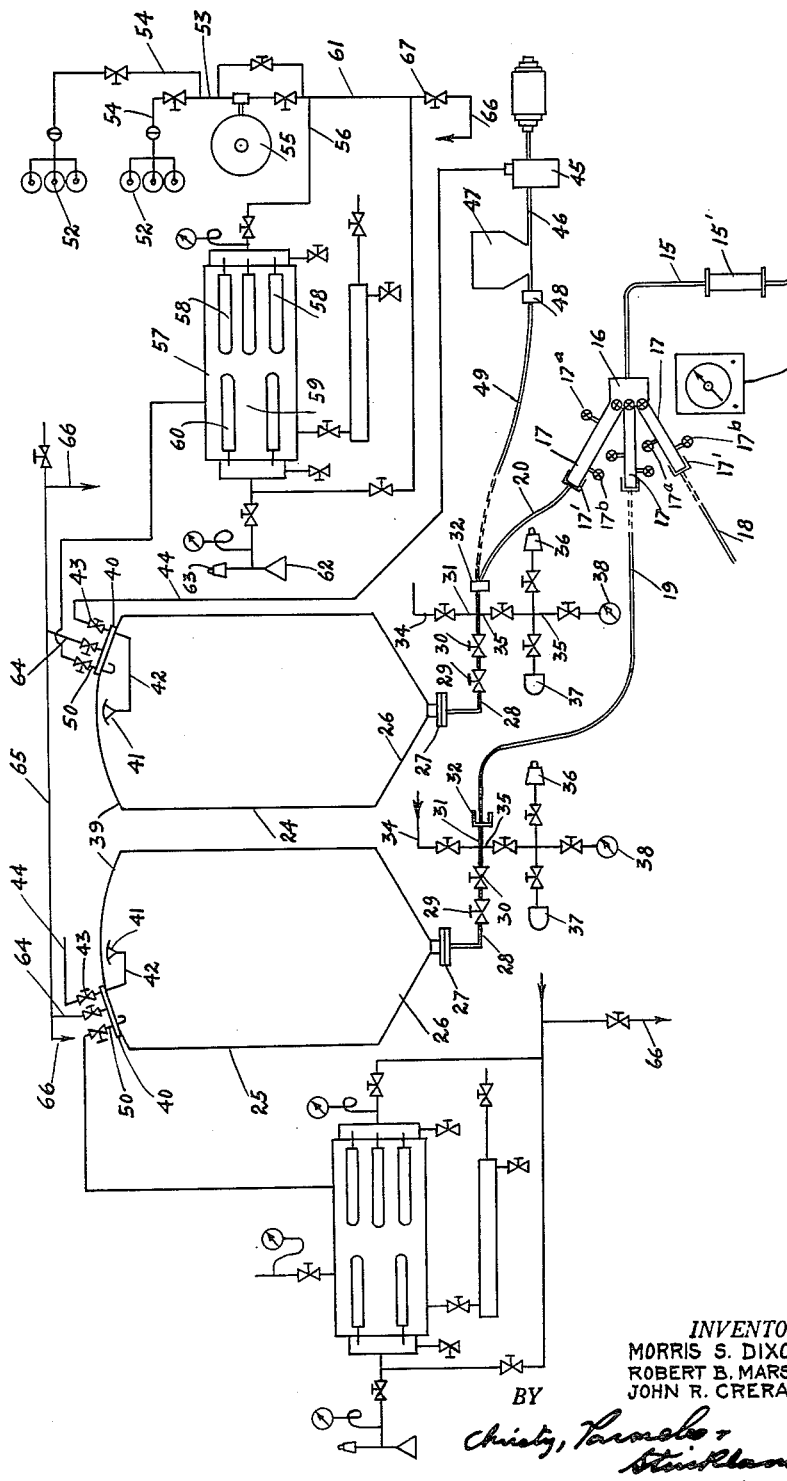

This invention relates to the processing of foods and vegetable substances that are normally produced seasonably in large quantities, and is for a method by which such food substances may be stored, transported and used as demand requires.

Our invention will be described with particular reference to tomato juice or concentrate, but this is by way of illustration and it is applicable to various vegetable and fruit purees, juices and concentrates or combinations and many other liquid or semi-liquid food products, more particularly those products which are normally first sterilized before storing.

The usual procedure is to place substances of this kind in relatively small cans which are hermetically sealed, but this is relatively expensive and permits only relatively small quantities to be put away for future conversion into finished marketable products.

Our invention is for a process in which tomato juice, for example, or concentrate, or pulp, may be charged into vessels which may be permanent storage vessels, or transportation vessels such as trucks or tank cars, and withdrawn when required for such use as may be required. Essentially it is a bulk method of handling, transporting and storing such products as distinguished from canning. In the case of ketchup, for example, tomatoes are now customarily converted into ketchup during the growing season, and in order to take advantage of the harvest, large facilities must be available. It requires a vast purchase of bottles, and of large purchases at one time of the sugar, vinegar and other ingredients so that the tomatoes can be converted into ketchup as they are harvested. It also requires large capacity processing facilities for cooking and bottling the product, and a year's supply, made in a few weeks, must be warehoused. With the present invention, the juice and pulp used for ketchup may be concentrated, stored in bulk, and processed into finished product from time to time through the ensuing months. Hence bottles and supplies can be purchased over the year as needed, and investment in inventory is reduced, while the plant investment may be smaller and operated productively from season to season. Ketchup is mentioned only as one typical end product of tomatoes, which of course are also widely used in other products.

According to our invention storage tanks of suitable size, often of many thousand gallons capacity, and of relatively inexpensive construction, but which may be of any suitable size, are filled with a fluid to displace oxygen, water generally being used. Then as the water or other fluid is drained out, it is replaced with nitrogen or other inert gas which need not be sterile. It is then sterilized with a non-toxic sterilizing medium which is recirculated through the system and then withdrawn, leaving the tank filled with nitrogen or inert gas above atmospheric pressure at all times. When the oxygen has thus been replaced by inert gas the liquid or semi-liquid vegetable product or concentrate which has been sterilized is pumped into the tank, displacing the inert gas. The product thus is kept from contact with air or organisms which might cause spoilage. If steam is used as a sterilizing fluid, low pressure steam is then preferably used for such period of time as may be required to assure sterilization, any condensate being drained away, after which the steam is replaced with inert gas at pressure above atmospheric pressure.

When the vessel or tank has been filled to its ultimate height there will remain at the top inert gas under pressure greater than atmospheric pressure. Leakage, if any, will therefore be from the inside out, and atmospheric air cannot enter. Provision is made for keeping this pressure constant in large vessels by leaving the source of nitrogen or other inert gas or gases permanently connected through a pressure regulator to the space above the stored product. If part of the contents is withdrawn, the pressure of inert gas will still be kept above atmospheric pressure, the gas replacing the product which is removed.

All of the product is removed through a so-called biological trap that constantly maintains steam, inert gas, or other aseptic media between the product in the vessel and the air.

The product so stored will remain in good condition and without spoiling for long periods of time at ambient temperatures, and when it is withdrawn it is just as satisfactory as the freshly made product. Important to this process is the fact that this discoloration of the product does not take place. In experimental equipment, tanks placed out of doors and subject to the extreme cold of winter and the warmth of summer have shown that the product will remain unaffected and good in every respect.

While the invention herein disclosed is described especially with respect to fixed containers or vessels, the same procedure may be used with tanks placed on railway cars and motor vehicles, and product may be withdrawn from a mobile tank and transferred later to a fixed tank, or vice versa.

Our invention may be more fully understood by reference to the accompanying drawings in which the FIGURE is a schematic diagram of a typical plant embodying our apparatus and method.

In the drawing, 15 designates a pipe leading from a source of supply of the liquid or semi-liquid product to be stored, and which has been previously sterilized by heat and then cooled, these procedures and apparatus for sterilizing and cooling being well-known in the art and forming no part of the present invention. The product in the pipe 15 is under pressure sufficient to force it into the storage tank to be hereinafter described. Pipe 15 terminates in a branched terminal or manifold 16, each branch of which has its terminal schematically indicated at 17, and which may be similar in construction to those provided on the several tanks, as hereinafter more fully described in detail. Steam may be supplied to each of these traps through valved pipes 17a, and there may be a valved outlet 17b. Each branch has a removable cap 17' designed to be removed when any one of the hoses or temporary conduits 18, 19 or 20 is connected thereto. Sanitary hose couplings of the type used in food processing are used.

The product flows through a sight glass 15' in line 15. In the drawing we have shown two storage tanks 24 and 25, which may be of any desired size, but which typically may be of the order of 20,000 gallons capacity each, and there may be several of them. Also, instead of being fixed tanks, they may be mobile, as for example tank cars or tank trucks.

The storage tanks 24 and 25 are of like construction. Each has a bottom 26 sloping toward a fitting 27 from which there extends a pipe 28 with a pair of shut-off valves 29 and 30 in series. Leading from valve 30 there is a short section of pipe 31 with a fitting 32 thereon which may be capped at times, and at other times have a hose attached thereto, as hereinafter more fully explained. Low pressure steam or sterile inert gas may be supplied to pipe section 31 through a valved supply pipe 34 and discharged therefrom through pipe 35 having a blow-off valve 36, a condensate trap 37, and a pressure gauge 38. This arrangement provides a completely sterile environment between valve 30 and the fitting 32 when the fitting is capped. Such an arrangement is known in the art as a biological seal or trap.

Each tank here shown has a top 39 which is domed and provided with a hermetically sealed removable manhole cover 40. All of the top fittings for the tank are carried on the manhole cover. These fittings include an inlet for tank sterilizing fluid, here shown as a spray head 41 on a pipe 42 leading through an external valve 43 to a supply pipe 44. While steam may be used as a sterilizing fluid, we prefer, for reasons hereinafter pointed out, to use a sterilizing liquid solution that is not poisonous, and several of which are well-known. This solution is supplied to the pipe 44 from a pump 45. On the inlet side of the pump is a pipe 46 and a hopper 47 and a connecting terminal 48. A hose 49 may connect terminal 48 with fitting 32. By means of this arrangement the acid solution may be dumped into the hopper 47, sprayed into the top of the tank, and withdrawn from the bottom and recirculated. The hose 49 may be connected in turn to each tank of the series, as may also pipe 44, thereby requiring but a single pump system, or there may be a separate pump and sterilizing system for each tank.

A second fitting on the manhole cover is a pipe 50 through which nitrogen or other inert gas may be introduced into the respective tanks. Pipe 50 has its discharge terminal inside the tank. While a manifolding system of nitrogen or inert gas distribution may be used, we prefer to have a separate supply of nitrogen for each tank. Bottled nitrogen is most conveniently used, and 52 indicates two separate batteries or groups of nitrogen gas bottles connected to line 53 through valved pipes 54, the arrangement enabling either group of bottles to be selectively used. Nitrogen gas line 53 leads to a pressure regulator 55 that reduces the gas to the desired pressure. Nitrogen from the pressure regulator is sent through a pipe 56 to a bacteria filter schematically indicated at 57, this being a well-known piece of equipment. The use of this filter, however, is not required. It has several hollow porous ceramic tubes or "candles" 58 therein through which the gas flows into an enclosure 59. Pipe 50 connects to this enclosure 59.

Other like tubes or candles 60 are in the enclosure 59, and gas from the regulator may flow through pipe 61 to these candles. A preset vacuum breaker 62 and a blow-off valve 63 are connected to pipe 61.

The manhole cover also has a vent pipe 64 passing through it. This preferably connects to a manifold 65, and a pipe 66 (partly broken away) connects this manifold through valve 67 to pipe 61, so that when a tank is being filled with liquid, displaced nitrogen can be delivered to another tank through the manifold, or recycled through the filters.

In carrying out our process, one of the tanks, for example 24, is readied to receive tomato pulp. A hose, such as 20, is connected to a branch of the fitting 16 and steam is admitted through pipe 17a. The other end of the hose is connected to the tank 24 at 32, and steam is supplied through pipe 34. The hose and the interior of all fittings are sterilized by the steam.

Also tank 24 is sterilized by introducing sterilizing fluid through spray head 41 and withdrawing it from the bottom of the tank. Steam may be used, but in view of the great possibility of condensing steam so used too rapidly and creating a vacuum in the tank, we prefer, as above mentioned, to use a non-poisonous sterilizing liquid.

The preferred procedure of making the tank ready before the hose 20 is attached is to first fill the tank with water. As the water is withdrawn, nitrogen or other inert gas (which may perhaps have been removed from another tank) flows under pressure greater than atmospheric pressure into the tank above the water so that when the water has been entirely removed, it will have been replaced with inert gas at sufficient pressure to prevent the inflow of air. The sterilizing solution is then sprayed into the tank and recycled for a period of time in the manner above described, wherein the solution is introduced into the hopper 47, forced by pump 45 through pipe 44 to the spray nozzle, where it thoroughly sprays the inside of the tank filled with inert gas. The sterilizing solution is withdrawn through the bottom of the tank and recirculated through hose 49.

When the tank and pipe system have been sterilized, hose 49 is disconnected and hose 20 connected and filled with steam as above explained. Then the steam at 17a is cut off, and previously sterilized and cooled tomato pulp or other product to be stored is directed into the hose 20 which is still connected to the steam supply line 34. The product flows into the hose 20 against this steam pressure, and when the product reaches the biological trap 31, valves 29 and 30 are opened as the supply of steam through pipe 34 is closed off. By first holding steam in the hose 20 at a positive pressure, the product is protected from exposure to bacteria and enters the tank in an aseptic condition. As the product fills the tank, the displaced inert gas escapes through pipe 64 and may be introduced through the manifold into the next tank 25 which by that time has been filled with water and readied for the inflow of the gas. The tank 24 is filled with pulp as far as possible, although it cannot be completely filled. When it has been filled to the limit, hose 20 is disconnected, fitting 32 is capped, and steam or other sterilizing media is supplied through pipe 34 to the biological trap. Hose 19, which has previously been connected to another branch of fitting 16 and filled with steam in the same manner as hose 20 then conducts the product to the previously readied tank 24. There may be several of these hoses used in succession while any that have been used are washed out and sterilized after such use. In this manner, a succession of tanks can be filled and if there is any shut-down, as at the end of each day, the pipes are washed and sterilized.

As each tank is filled, it is left connected to its nitrogen supply system and a pressure of about two pounds maintained at all times so that leakage, if any, will be from and not into the top of the tank. Also, as each tank is filled, the valves 29 and 30 are closed and low pressure steam or sterile gas is continuously supplied to pipe 31, the fitting 32 being closed with a cap when hose 20 is disconnected.

The product should be cooled after it is sterilized and before entering the tank, because if it were introduced hot into tanks so large, the heat would not be dissipated rapidly enough, and discoloration or change of flavor might ensue. Two valves 29 and 30 are provided so that if valve 30 needs repair or leaks, the product in the tank will be protected from the fluid in the biological trap and permit repair to be made and the trap sterilized between valve 29 and fitting 32.

Nitrogen is a preferred inert gas because it is inexpensive and easily available, but any gas inert to the product being stored may be used, particularly the heavy gases such as argon, helium and crypton or mixtures thereof, because they are non-toxic, inert, stable, and adaptable to industrial handling.

While we have shown and described one preferred embodiment of our invention, it will be understood that various changes and modifications may be made to suit particular plant or product conditions or other factors, all within the contemplation of our invention as defined in the appended claim.

We claim:

The method of storing an aseptically cooled and sterilized food product which is capable of being pumped from a source into a sterile tank having a sterile inlet and containing an inert gas, comprising the steps of: closing the tank inlet, connecting the closed sterile tank inlet to the food product source with a sterile conduit,
introducing sterilizing steam under pressure into the conduit,
pumping the food product against the pressure of the sterilizing steam whereby the product advances toward the inlet and displaces the steam by the advancement to maintain a sterile atmosphere in the conduit immediately preceding the advancing front of the product,
simultaneously terminating the introduction of the steam into the conduit and opening the tank inlet to fill the tank with the sterile food product to a desired level and displacing an equal volume of the inert gas in the tank,
closing the tank inlet,
maintaining in the tank the inert gas a super-atmospheric pressure above the level of the food product in the tank whereby a sterile fluid seal is effected between the product and the atmosphere without the tank,
closing the conduit connection with the product source,
and introducing a sterilizing medium into the conduit to effect a fluid seal between the tank inlet and the atmosphere without the conduit.

References Cited in the file of this patent

UNITED STATES PATENTS

| | | |
|---|---|---|
| 1,260,255 | Chevalley | Mar. 19, 1918 |
| 1,418,457 | Owen | June 6, 1922 |
| 2,147,271 | Schwarz | Feb. 14, 1939 |
| 2,179,327 | Evans | Nov. 7, 1939 |
| 2,297,190 | McKinnis | Sept. 29, 1942 |
| 2,309,007 | Parsons | Jan. 19, 1943 |
| 2,789,059 | Lindwald | Apr. 16, 1957 |